United States Patent
Schüler et al.

(10) Patent No.: US 12,103,835 B2
(45) Date of Patent: Oct. 1, 2024

(54) INDUSTRIAL TRUCK HAVING AT LEAST ONE SUPPORT WHEEL

(71) Applicant: Jungheinrich Aktiengesellschaft, Hamburg (DE)

(72) Inventors: Michael Schüler, Wakendorf II (DE); Helmut Lohmann, Nartum-Gyhum (DE); Holger Brunckhorst, Norderstedt (DE); Marcel Krenzin, Bad Bramstedt (DE)

(73) Assignee: Jungheinrich Aktiengesellschaft, Hamburg (DE)

( * ) Notice: Subject to any disclaimer, the term of this patent is extended or adjusted under 35 U.S.C. 154(b) by 171 days.

(21) Appl. No.: 17/691,194

(22) Filed: Mar. 10, 2022

(65) Prior Publication Data
US 2022/0289541 A1  Sep. 15, 2022

(30) Foreign Application Priority Data

Mar. 10, 2021 (DE) .................. 10 2021 105 790.6

(51) Int. Cl.
*B66F 9/075* (2006.01)
*B60B 33/00* (2006.01)

(52) U.S. Cl.
CPC ...... *B66F 9/07586* (2013.01); *B60B 33/0055* (2013.01); *B66F 9/07559* (2013.01)

(58) Field of Classification Search
CPC ............. B60B 33/0055; B66F 9/07586; B66F 9/0759; B66F 9/075
See application file for complete search history.

(56) References Cited

U.S. PATENT DOCUMENTS

| 3,424,475 A | 1/1969 | Gibson |
| 2016/0340162 A1* | 11/2016 | Standard .................. B62B 5/00 |

FOREIGN PATENT DOCUMENTS

| DE | 3904798 A | * | 8/1990 | .......... B62B 3/0612 |
| DE | 3904798 A1 | | 8/1990 | |
| DE | 4227954 A1 | | 2/1994 | |
| DE | 29918832 U1 | | 3/2000 | |
| DE | 10022400 A1 | | 10/2001 | |
| DE | 102013100073 A1 | | 7/2014 | |
| DE | 102019101864 A1 | | 8/2020 | |
| EP | 2766295 A1 | | 8/2014 | |
| EP | 3730450 B1 | | 7/2021 | |
| JP | 2002145128 A | * | 5/2002 | ............ B66F 9/0759 |
| KR | 200304184 Y1 | | 2/2003 | |
| WO | 2013/053005 A1 | | 4/2013 | |

OTHER PUBLICATIONS

European Application No. 22160019.0; filed Mar. 3, 2022; European Search Report dated Aug. 17, 2022 (12 pages).
German Application No. 10 2021 105 790.6; filed Mar. 10, 2021; German Search Report dated Dec. 13, 2021 (6 pages).

* cited by examiner

Primary Examiner — Tyrone V Hall, Jr.
(74) Attorney, Agent, or Firm — Barclay Damon LLP

(57) ABSTRACT

An industrial truck comprises a load part comprises a load-carrying means including at least one load wheel and a drive part including a vehicle frame defining an opening. A steerable drive wheel and at least one support wheel are arranged on the vehicle frame. The at least one support wheel is arranged on a side of the drive wheel that faces away from the load part and is mounted as a trailing wheel that swivels about a vertical axis. The at least one support wheel is configured to at least partially protrude through the opening defined in the vehicle frame.

20 Claims, 5 Drawing Sheets

INDUSTRIAL TRUCK HAVING AT LEAST ONE SUPPORT WHEEL

CROSS REFERENCE TO RELATED INVENTION

This application is based upon and claims priority to, under relevant sections of 35 U.S.C. § 119, German Patent Application No. 10 2021 105 790.6, filed Mar. 10, 2021, the entire contents of which are hereby incorporated by reference.

TECHNOLOGICAL FIELD

The present disclosure relates to an industrial truck that is equipped with at least one support wheel.

BACKGROUND

In industrial trucks, and in particular in ride-on industrial trucks, the load part of the industrial truck is supported via load rollers or load wheels. The load wheels are generally arranged at the end of the load forks. The drive portion of an industrial truck is equipped with a steerable drive wheel via which the industrial truck is driven and steered. Additionally, support wheels are arranged on the drive portion of the industrial truck in order to prevent the vehicle from tilting to the side, for example in the event of strong acceleration and low load. In the event of backward tilting, which can occur in the case of unfavorable overall mass distribution, the load wheels at the tip of the fork tine lift off of the ground.

In ride-on trucks, which have a sufficiently heavy battery and/or a heavy lift frame, the problem of backward tilting does not occur, since the mass behind the drive portion is sufficiently high to prevent the load wheels from lifting off of the ground. In low-lift trucks having a correspondingly light battery and, in particular, in ride-on trucks that do not have a lift frame, the load wheels can lift off of the ground and the truck can tilt backward.

It is known to provide support wheels on the drive part. However, a disadvantage of this is that the installation space is limited and a distance between the support wheel and drive wheel is too short to generate a sufficiently high counter-torque. Furthermore, it is known to provide the tip of the fork tine with additional weights. However, there is also little installation space available in the tip of the fork tine and an additional weight incurs additional costs. Moreover, attaching additional weights at other locations on the vehicle, for example on or in the battery holder, requires large weights on account of the distances, which thus incurs additional costs. It has also been proposed to reduce the travel speeds during empty runs in the drive direction in order to eliminate the risk of backward tilting. However, intervention of this kind in the control of the vehicle reduces the performance of the vehicle.

The object of the invention is therefore to prevent backward tilting over the drive wheel using the simplest means possible in an industrial truck.

BRIEF SUMMARY OF THE INVENTION

In an embodiment, the industrial truck comprises a drive part and a load part. The load part is equipped with a load-carrying means, for example a pair of fork tines. The load-carrying means comprises at least one load wheel, which supports the load part and thus also the drive part. The drive part of the industrial truck comprises a vehicle frame in which a steerable drive wheel and at least one support wheel are arranged. The at least one support wheel is arranged on the side of the drive wheel that faces away from the load part. The support wheel is arranged as a trailing wheel that can swivel about a vertical axis. According to the invention, the vehicle frame comprises an opening corresponding to the at least one support wheel. Preferably, at least one frame part of the vehicle frame comprises a corresponding opening, more preferably the frame part is designed as a sheet metal part, wherein the opening is preferably formed as a cutout in a frame part. In the case of a trail directed away from the load part, the at least one support wheel protrudes through the opening in the vehicle frame. In the prior art, the vehicle frame of industrial trucks limits the arrangement of the support wheel, and therefore the opening according to the invention in the vehicle frame provides a larger distance between the drive wheel and the support wheel, which generates a higher counter-torque that counteracts the tilting. In this connection, it is particularly advantageous that the chassis space of the drive portion does not have to be enlarged, but rather the at least one support wheel partially protrudes on account of the limitation of the chassis that was usual previously.

In a preferred embodiment, the at least one support wheel has a horizontal axis of rotation and a vertical swivel axis as the vertical axis. The distance between the horizontal axis of rotation and the vertical swivel axis forms the trail, the direction of which points away from the swivel axis.

In a preferred embodiment, the distance between the vertical swivel axis and vehicle frame is less than the total of the trail and half of the support wheel diameter. Preferably, the distance is greater than the trail. This means that the horizontal axis of rotation of the support wheel remains within the vehicle frame, while a part of the support wheel that is further away protrudes from the vehicle frame. However, if the distance is greater than the trail, the horizontal axis of rotation of the support wheel also emerges through the opening.

In an embodiment, two support wheels are provided, the connecting line of which is transverse to the vehicle longitudinal axis. Preferably, the two support wheels are at the same distance from the drive wheel, such that the supporting torque of the support wheels is of the same magnitude on the left and right.

In another embodiment, an opening is provided in the vehicle frame for each of the two support wheels. Two spatially limited openings weaken the vehicle frame only slightly and allow for the support wheels to protrude through the respective opening.

In an embodiment, the vehicle frame comprises a boundary plate which stands transversely to the vehicle longitudinal direction and in which the at least one opening is provided. The boundary plate may be designed as a sheet of metal inserted in the vehicle frame. In the case of a vehicle frame formed as a whole of one piece, the boundary plate may also define a section of the vehicle frame without being provided as a separate component. Other components that adjoin the vehicle frame may also comprise a supplementary opening in order to allow the support wheel to swivel.

In an embodiment, the boundary plate is arranged upright in the vehicle frame and has a lower edge close to the ground. The lower edge close to the ground may, for example, be at a distance from the ground, said distance corresponding to the ground clearance of the driver part.

In an embodiment, the vehicle frame comprises a transverse plate in which at least one opening is provided. The transverse plate is preferably arranged on the side of the boundary plate that faces away from the load part. Expediently, the boundary plate and the transverse plate form a right angle with one another, wherein the opening extends over both plates in this case. The transverse plate may also be a part of the vehicle frame that is separate from the boundary plate and comprise the corresponding opening.

In an embodiment, the drive part comprises a stepping platform that can swivel about a horizontal axis, wherein the boundary plate forms the end of the vehicle frame that faces the stepping platform. In this case, the vehicle is a ride-on truck that allows the driver to swing out the stepping platform and stand thereon in order to ride along.

In an alternative embodiment, the drive part comprises a driver's standing space. In this case, the boundary plate is arranged in the vehicle frame on the end of the driver's standing platform that faces the load part. The drive part of the industrial truck having a driver's standing platform may be divided into two parts, for example a front chassis section and a rear standing section. The boundary between the two sections is formed by the boundary plate.

In an embodiment, the at least one support wheel is configured as a fixed roller. One, two or three support wheels may be provided, wherein, if two support wheels are used, these may be arranged on a torsion bar. The torsion bar couples the movement of the two support wheels. In addition, the torsion bar can also build up supporting, laterally stabilizing support torques for the vehicle.

BRIEF DESCRIPTION OF THE DRAWINGS

The invention will be explained in more detail below with the aid of the figures.

DETAILED DESCRIPTION OF THE INVENTION

Figure 1:
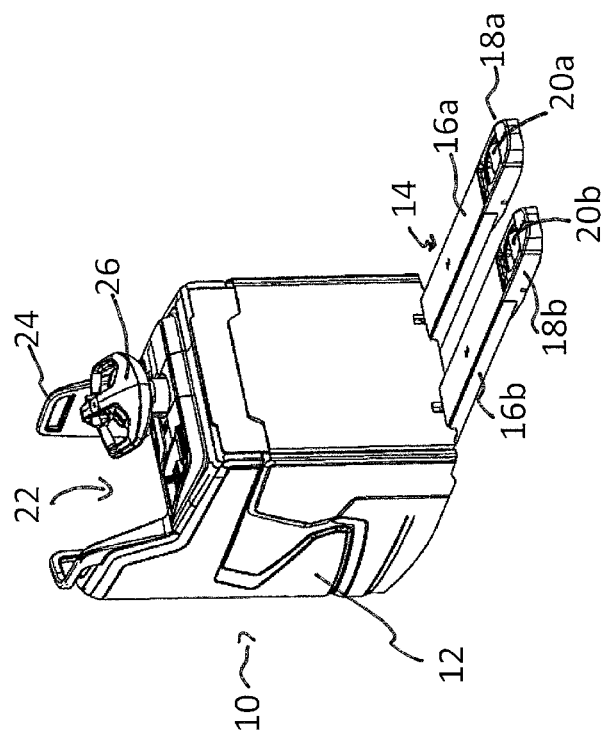
FIG. 1 illustrates a perspective front view of an embodiment of a low-lift industrial truck having a vehicle frame.

FIG. 1 shows a low-lift industrial truck 10 comprising a drive part 12 and a load part 14. The load part 14 comprises two fork tines 16a, 16b as load-carrying means, which extend in parallel with one another and each have a fork tip 18a, 18b. The fork tips 18 are solid in order to prevent damage when picking up and setting down loads. Each of the fork tips 18 is equipped with a load roller 20a, 20b. The load rollers 20, which may also be configured as load wheels, are used to raise the load forks 16 for an initial lift and then set them down again.

The drive part 12 comprises a driver's standing platform 22, on which a vehicle driver riding along can stand. From the driver's standing platform, the vehicle driver has access to the operating element 26, which is configured in the manner of a steering wheel. The operating element 26 is used to control functioning of the vehicle. The driver can also grip lateral grip elements 24 next to the operating element 26.

Figure 2:
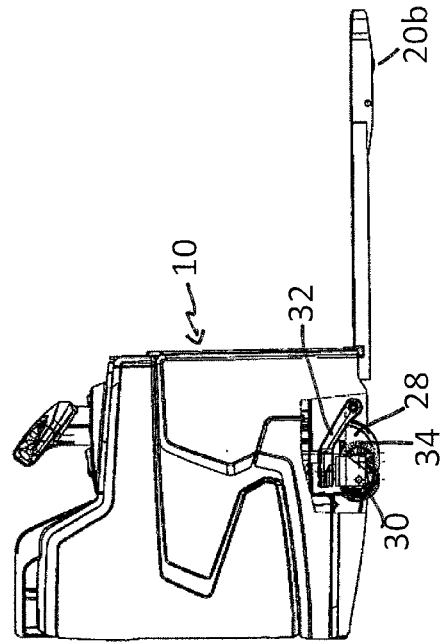
FIG. 2 illustrates a side view of the embodiment of FIG. 1 further showing the drive wheel and support wheels.

FIG. 2 shows the industrial truck 10 in a view from the side, wherein the drive wheel 28 has been exposed for a better overview. The entire vehicle is supported relative to the vehicle longitudinal axis by means of the load rollers 20 and the drive wheel 28. In the event of an unfavorable weight distribution and an externally applied torque, for example on a ramp, the situation in which the vehicle tilts backward over the drive wheel 28 can arise, wherein the load rollers 20 then lose grip on the ground. A torque of this kind that causes the vehicle to tilt backward can be static or dynamic.

FIG. 2 also shows a support wheel 30, which is mounted on a torsion bar 32. The support wheel 30 is designed as a fixed roller, which is oriented with its trail in the travel direction of the vehicle. In principle, depending on the configuration of the vehicle, it may be sufficient for only one support wheel to be provided. If the vehicle moves in the direction of its load part, the trail of the support wheel is oriented such that the horizontal axis of rotation of the support wheel is at a large distance from the drive wheel. This increases the support torque applied by means of the support wheel. If the vehicle travels in the direction of its drive part, the orientation of the trail switches round and the support wheel 34 shown as a dashed line is located closer to the drive wheel 28.

Figure 3:
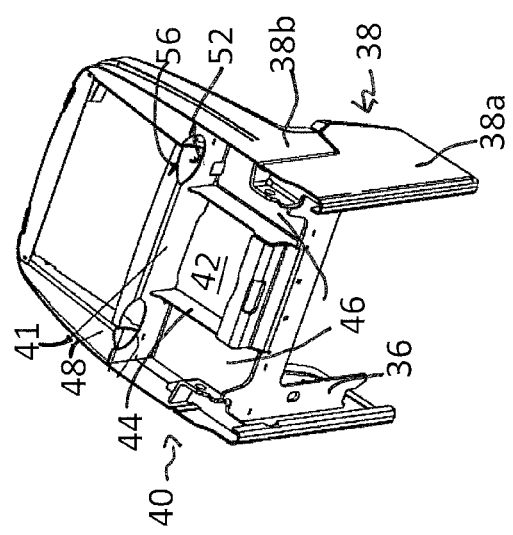
FIG. 3 illustrates a bottom view of an embodiment of the vehicle frame of FIG. 1 shows the vehicle frame of the vehicle from FIG. 1.

FIG. 3 shows the vehicle frame in a perspective view from below. The vehicle frame has a front wall 36, which forms a transition to the load part. The side walls 38 and 40 extend in the vehicle longitudinal direction and laterally delimit the drive part. The side walls 38, 40 may be integrally formed or, as in the previous example, be comprised of two side wall portions 38a and 38b. The side walls are interconnected by means of a boundary plate 41, which is arranged so as to be vertically upright between the side walls 38 and 40. The boundary plate 41 delimits an aperture 42, in which the drive wheel is arranged. Side plates 44 and base plates 46, which additionally stabilize the vehicle frame, are provided adjacent to the aperture 42. A frame 48, which receives the driver's standing platform, is located on the side of the boundary plate 41 that faces away from the load part.

FIG. 3 shows two openings in the form of cutouts 50, 52 in the boundary plate 41. The cutouts 50, 52 have an oval shape, wherein the cutouts are at their widest at the lower edge of the boundary plate 41. Cutouts 54, 56 corresponding to the cutouts 50, 52, respectively, in the vertical boundary plate are also provided in the horizontally arranged frame 48 for the driver's standing platform. The horizontal cutouts 54, 56 also have an oval contour. The geometry of the cutouts 50 and 54 as well as 52 and 56 is defined such that a support roller can swivel in the respective pair of cutouts.

Figure 4:
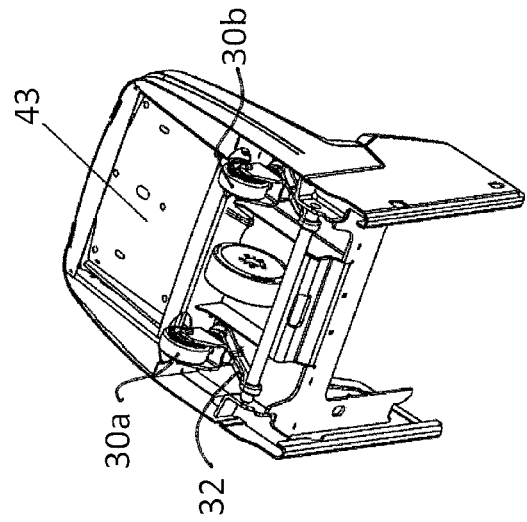
FIG. 4 illustrates the vehicle frame from FIG. 3 with wheels.

FIG. 4 shows how the two support wheels 30a, 30b protrude with part of their wheel into the cutouts. Since the boundary plate 41 and the frame for the driver's standing platform 48 meet at a right angle, the opening formed as a whole corresponds to an oval shape of the like formed by folding an ellipse by 90° along its major axis.

Figure 5:
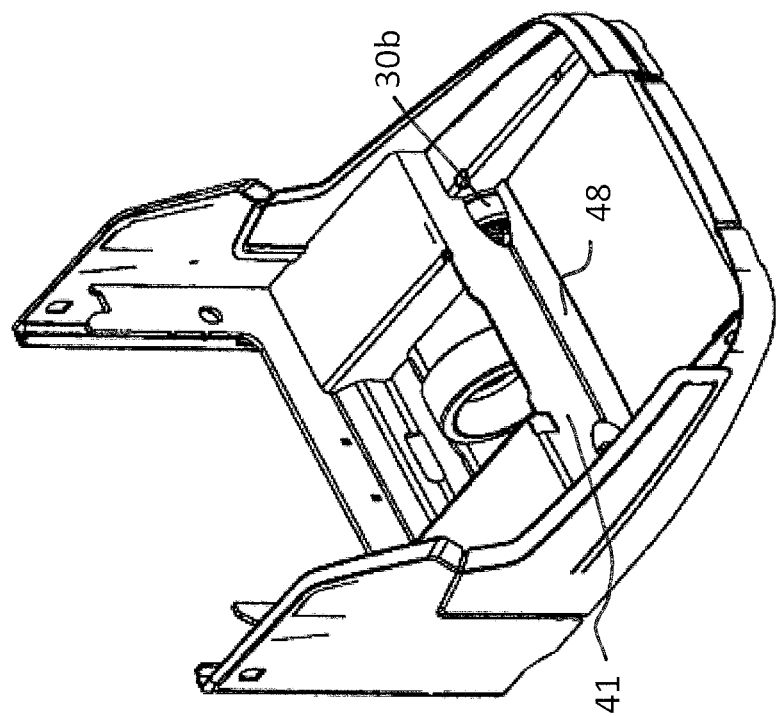
FIG. 5 illustrates perspective view of the vehicle frame of FIG. 4 with the driver's standing platform.

The geometry is also shown clearly in FIG. 5, in which the support wheel 30b that protrudes in part through the opening can be seen.

Figure 6:
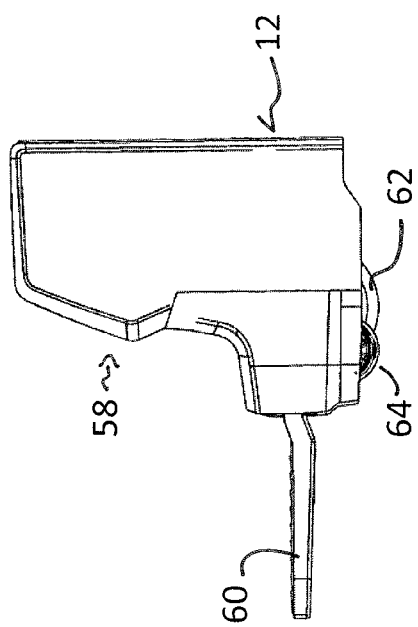
FIG. 6 illustrates a side view of an embodiment of a drive part for a low-lift industrial truck with a hinged stepping platform.

FIG. 6 shows the drive part 58 for a low-lift truck having a hinged stepping platform 60, which has been swung down for use by the driver. The drive part 58 comprises a drive wheel 62 and a support wheel 64.

Figure 7:
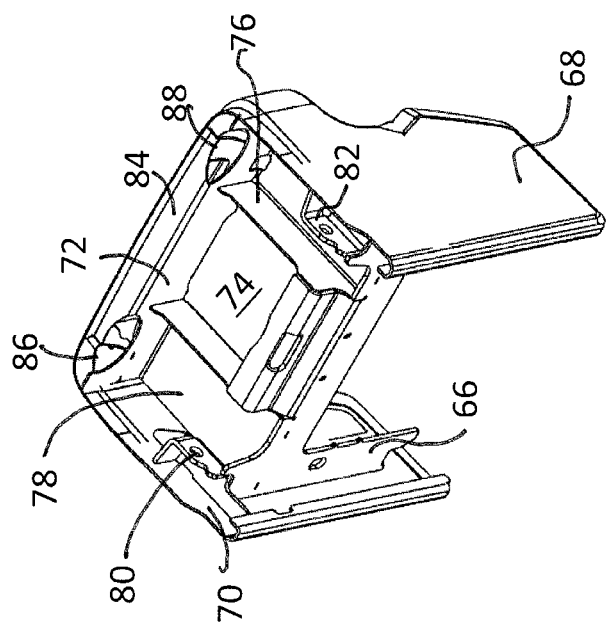
FIG. 7 illustrates a perspective bottom view of another embodiment of the vehicle frame.

FIG. 7 shows the design of the vehicle frame, which structurally corresponds to the design described in FIG. 3. A front wall 66 can be seen, which is provided for connection to the load part. The frame outer walls 68, 70 have a similar design to the vehicle having the driver's standing platform, but are shorter in relation to the vehicle longitudinal direction. The frame outer walls 68, 70 are interconnected by means of a boundary plate 72. The aperture 74 for the drive wheel (not shown) adjoins the boundary plate 72. The aperture 74 is laterally delimited by means of the side plates 76 and the base plate 78. The bracket 80, 82 for the torsion bar (not shown) can also be seen. A horizontal transverse plate 84 adjoins the boundary plate 72 at a right angle. In the embodiment according to FIGS. 1 to 5, said horizontal transverse plate was part of the frame supporting the driver's standing platform. However, in the embodiment according to FIGS. 6 to 9, in which no driver's standing platform is provided, the horizontal transverse plate 84 is provided for stability reasons. In addition, the horizontal transverse plate 84 simplifies attachment of the hinged stepping platform 60.

Figure 8:
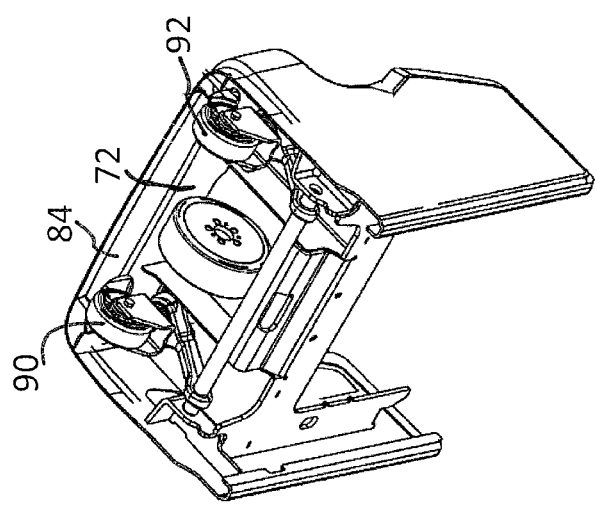
FIG. 8 illustrates the embodiment of the vehicle frame from FIG. 7 with wheels.

FIGS. 7 and 8 show the respective opening in the boundary wall 72 and in the horizontal transverse plate 84. The openings 86 and 88 have an oval shape as cutouts through which part of the support wheel protrudes. In FIG. 8, the support wheels 90, 92 are shown in their protruding position, in which the trail is directed away from the drive wheel.

Figure 9:
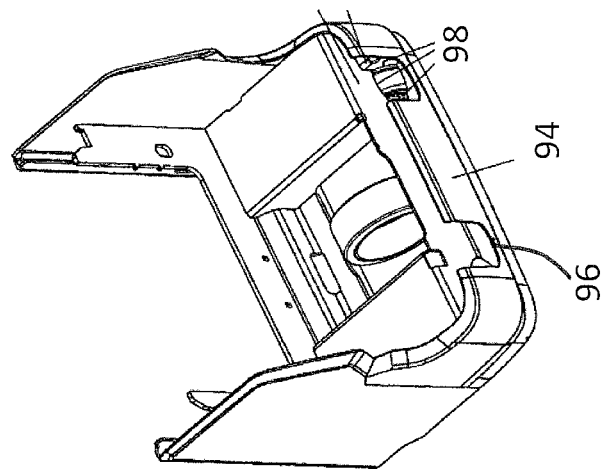
FIG. 9 illustrates a perspective view of the vehicle frame showing the drive wheel.

FIG. 9 shows the vehicle frame having a skirt 94. The skirt 94 comprises two cutouts 96, 98, via which the stepping platform 60 is hingedly articulated to the vehicle frame.

With regard to the dimensions of the cutouts 86, 88, a distinction should be made as to whether the support wheels are sprung or unsprung. If the support wheels are sprung, the openings must accordingly be larger in size, such that the support wheel swiveled into the opening can still cover its intended spring travel. In the case of unsprung support wheels, the cutouts can be smaller, i.e. just large enough to allow the support wheel to swivel freely in and out of the cutouts.

LIST OF REFERENCE SIGNS

- 10 Low-lift truck
- 12 Drive part
- 14 Load part
- 16a,b Fork tines
- 18a, b Fork tips
- 20a, b Load rollers
- 22 Driver's standing platform
- 24 Grip elements
- 26 Operating element
- 28 Drive wheel
- 30 Support wheel
- 30a, b Support wheel
- 32 Torsion bar
- 34 Support wheel
- 36 Front wall
- 38 Side wall
- 40 Side wall
- 41 Boundary plate
- 42 Aperture
- 44 Side plate
- 46 Base plate
- 48 Frame
- 50 Cutout
- 52 Cutout
- 54 Cutout
- 56 Cutout
- 58 Drive part
- 60 Hinged stepping platform
- 62 Drive wheel
- 64 Support wheel
- 66 Front wall
- 68 Frame outer wall
- 70 Frame outer wall
- 72 Boundary plate
- 74 Aperture
- 76 Side plates
- 78 Base plate
- 80 Bracket
- 82 Bracket
- 84 Transverse plate
- 86 Cutout
- 88 Cutout
- 90 Support wheel
- 92 Support wheel
- 94 Skirt
- 96 Cutout
- 98 Cutout

The invention claimed is:

1. An industrial truck comprising:
a load part comprising at least one load wheel;
a drive part including a vehicle frame defining an opening, the vehicle frame comprises,
a boundary plate that traverses a vehicle longitudinal direction, wherein at least one aperture is defined by the boundary plate, and
a transverse plate defining at least one passage; and
a steerable drive wheel and at least one support wheel arranged on the vehicle frame,
wherein the at least one support wheel is arranged on a side of the drive wheel that faces away from the load part,
wherein the at least one support wheel and is mounted as a trailing wheel configured to swivel about a vertical axis,
wherein the at least one support wheel is configured to at least partially protrude through the opening defined in the vehicle frame, and
wherein the transverse plate and the boundary plate at least partially define the opening in the vehicle frame, and wherein the transverse plate is positioned against a side of the boundary plate that faces away from the load part and the opening.

2. The industrial truck according to claim 1, wherein at least one support wheel comprises a horizontal axis of rotation and a vertical swivel axis, and wherein the horizontal axis of rotation is spaced apart from the vertical swivel axis to form a trail.

3. The industrial truck of claim 2, wherein when the trail is directed away from the load part, the at least one support wheel protrudes through the opening defined by the vehicle frame.

4. The industrial truck according to claim 2, wherein the vertical swivel axis is spaced apart from the vehicle frame at a distance that is less than a total of the trail and half of a diameter of the support wheel.

5. The industrial truck according to claim 1, further comprising a second support wheel positioned on an opposite side of the vehicle frame, wherein a support wheel axis extends between the at least one support wheel and the second support wheel, and wherein the support wheel axis traverses a vehicle longitudinal axis.

6. The industrial truck according to claim 5, wherein the vehicle frame defines two openings configured for each support wheel.

7. The industrial truck according to claim 5, wherein the at least one support wheel and the second support wheel are arranged on a torsion bar.

8. The industrial truck according to claim 1, wherein the boundary plate is configured to stand upright relative to the vehicle frame and further comprises a lower edge that is positioned towards a ground surface.

9. The industrial truck according to claim 1, wherein the drive part further comprises a stepping platform configured to swing about a horizontal axis, and wherein the boundary plate forms an end of the vehicle frame and is configured to face the stepping platform.

10. The industrial truck according to claim 1, wherein the drive part further comprises a driver's standing surface, and wherein the boundary plate is positioned on an end of the driver's standing surface that faces the load part.

11. The industrial truck according to claim 1, wherein the at least one support wheel is configured as a fixed roller.

12. An industrial truck comprising:
a load part comprising at least one load wheel;
a drive part including a vehicle frame defining an opening, the vehicle frame comprises,
  a boundary plate that traverses a vehicle longitudinal direction, wherein at least one aperture is defined by the boundary plate,
  a horizontally arranged frame, and
  driver's standing platform at least partially supported by the horizontally arranged frame, wherein the boundary plate is positioned on an end of the driver's standing platform that faces the load part; and
a steerable drive wheel and at least one support wheel arranged on the vehicle frame,
wherein the at least one support wheel is arranged on a side of the drive wheel that faces away from the load part,
wherein the at least one support wheel and is mounted as a trailing wheel configured to swivel about a vertical axis,
wherein the at least one support wheel is configured to at least partially protrude through the opening defined in the vehicle frame, and
wherein the horizontally arranged frame and the boundary plate at least partially define the opening in the vehicle frame, and wherein the horizontally arranged frame is positioned against a side of the boundary plate that faces away from the load part and the opening.

13. The industrial truck of claim 12, wherein at least one support wheel comprises a horizontal axis of rotation and a vertical swivel axis, and wherein the horizontal axis of rotation is spaced apart from the vertical swivel axis to form a trail.

14. The industrial truck of claim 13, wherein when the trail is directed away from the load part, the at least one support wheel protrudes through the opening defined by the vehicle frame.

15. The industrial truck according to claim 13, wherein the vertical swivel axis is spaced apart from the vehicle frame at a distance that is less than a total of the trail and half of a diameter of the support wheel.

16. The industrial truck according to claim 12, further comprising a second support wheel positioned on an opposite side of the vehicle frame, wherein a support wheel axis extends between the at least one support wheel and the second support wheel, and wherein the support wheel axis traverses a vehicle longitudinal axis.

17. The industrial truck according to claim 16, wherein the at least one support wheel and the second support wheel are arranged on a torsion bar.

18. The industrial truck according to claim 16, wherein the vehicle frame defines two openings configured for each support wheel.

19. The industrial truck according to claim 12, wherein the boundary plate is configured to stand upright relative to the vehicle frame and further comprises a lower edge that is positioned towards a ground surface.

20. The industrial truck according to claim 12, wherein the at least one support wheel is configured as a fixed roller.

* * * * *